March 24, 1942.  H. T. LOWRY  2,277,122
EYE TESTING APPARATUS
Filed July 3, 1939  2 Sheets-Sheet 1
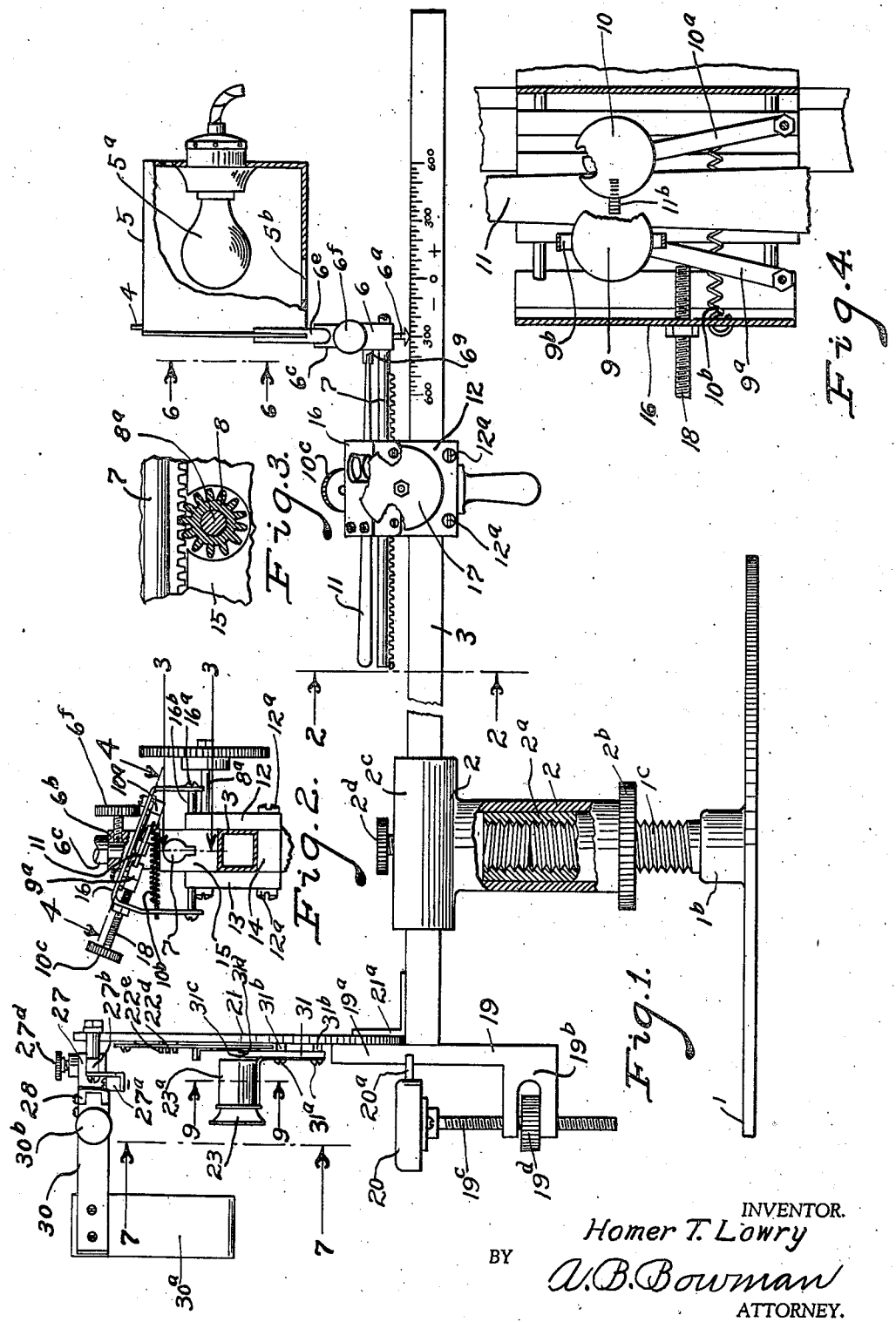
INVENTOR.
Homer T. Lowry
BY
A. B. Bowman
ATTORNEY.

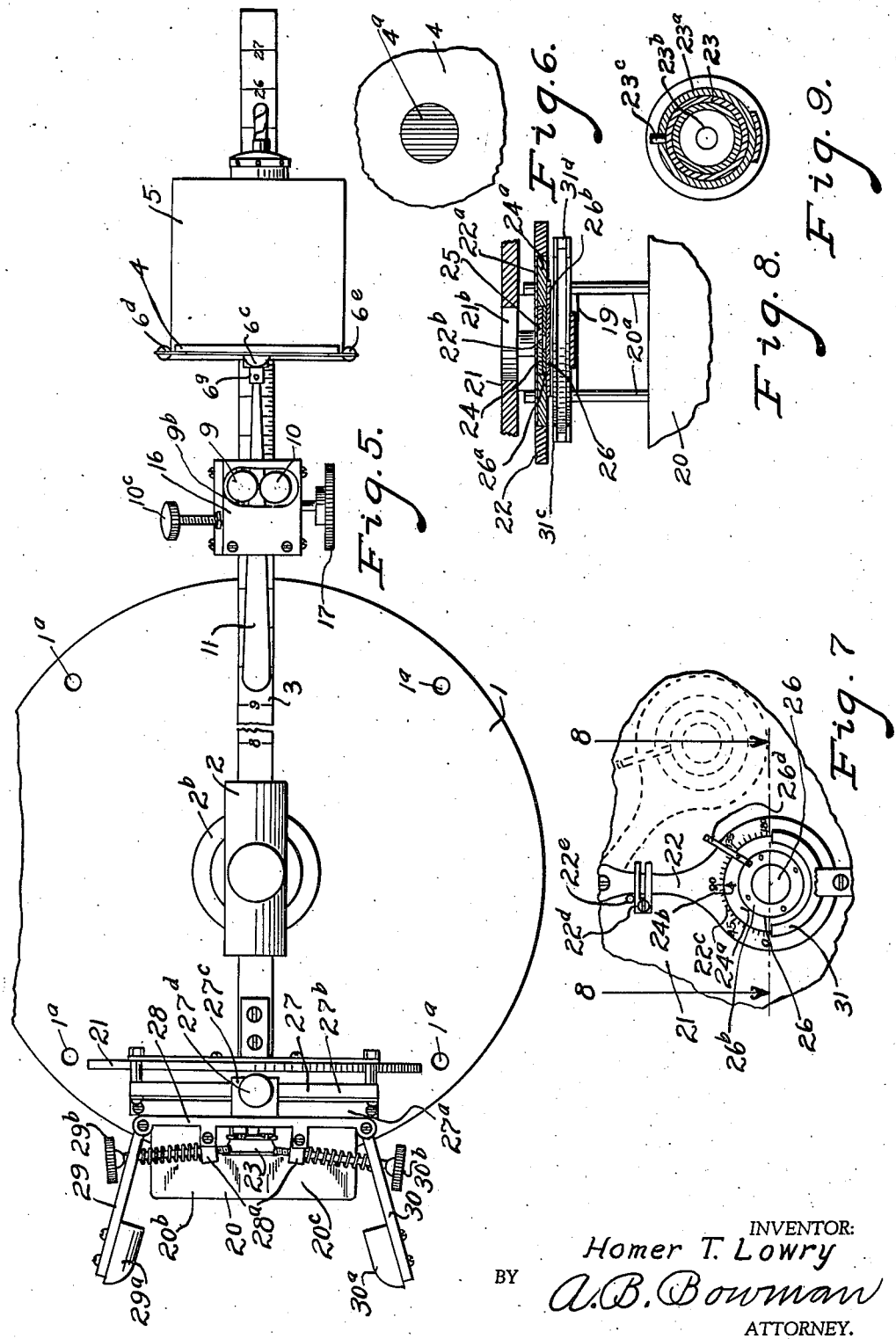

Patented Mar. 24, 1942

2,277,122

UNITED STATES PATENT OFFICE 2,277,122

EYE TESTING APPARATUS

Homer T. Lowry, San Diego, Calif.

Application July 3, 1939, Serial No. 282,681

7 Claims. (Cl. 88—20)

My invention relates to an apparatus for testing eyes to determine refractive errors or similar faults therein and is both a subjective and objective apparatus test type as distinguished from either the objective or subjective test type of apparatus and the objects of my invention are:

First, to provide an eye testing apparatus of this class that will indicate any error of refraction of the human eye without the aid of refractive lenses;

Second, to provide an apparatus of this class with a minus and plus gage control which may be manipulated by the operator for quickly determining and indicating any error of refraction in either or both eyes of the person being tested;

Third, to provide an apparatus of this class which definitely indicates the approximate correction necessary in the diopters and fractions of diopters determined from the scale on said apparatus;

Fourth, to provide an apparatus of this class which will refract the most difficult cases such as those requiring cross cylinders etc. in the conventional manner in a minimum of time by an operator who is familiar with and skilled in the science of optometry;

Fifth, to provide an apparatus of this class which provides a substantial dioptic computation directly from the instrument or testing apparatus;

Sixth, to provide an apparatus of this class which will provide a complete subjective test in refracting the human eye without the aid of any other machine, trial case equipment or device;

Seventh, to provide an apparatus of this class which provides a combination of both the subjective and objective eye testing apparatus;

Eighth, to provide an apparatus of this class which is very simple and economical of construction, easy to operate, efficient in its action, positive and accurate and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a side elevational view of my eye testing apparatus showing portions broken away and in section to facilitate the illustration; Fig. 2 is a transverse sectional view taken from the line 2—2 of Fig. 1 shown on a slightly enlarged scale; Fig. 3 is a fragmentary sectional view on an enlarged scale taken from the line 3—3 of Fig. 2; Fig. 4 is an enlarged sectional view taken from the line 4—4 of Fig. 2; Fig. 5 is a top or plan view of my eye testing apparatus showing some of the portions fragmentarily; Fig. 6 is a fragmentary front elevational view of the target taken from the line 6—6 of Fig. 1; Fig. 7 is a front elevational view of the head plate of the machine taken from the line 7—7 of Fig. 1; Fig. 8 is an enlarged sectional view taken from the line 8—8 of Fig. 7 and Fig. 9 is an enlarged sectional view taken from the line 9—9 of Fig. 1.

Similar characters of reference refer to similar parts and portions throughout the several views of the drawings.

The base member 1, adjustable upright 2, main bar 3, target means 4, target illuminating box 5, target supporting member 6, target adjusting rack 7, target adjusting rack pinion 8, objective indicators 9 and 10, objective indicator control bar 11, adjusting rack support members 12, 13, 14 and 15, objective indicator support 16, hand wheel 17, objective indicator members adjusting screw 18, chin rest support 19, chin rest 20, head plate 21, prism support 22, sight member 23, double prisms 24 and 25, plus two spherical segments 26, head adjusting rack support 27, head adjusting rack 28, and head adjusting members 29 and 30 constitute the principal parts of my eye testing apparatus.

The base member 1 is a flat disk like plate adapted to rest on a table or other flat surface and may be secured in position by bolts in the holes 1a for rigidly supporting my eye testing apparatus. This base member 1 is provided with a central upright lug portion 1b which is provided with a reduced screw threaded portion 1c which extends upwardly some distance as shown best in Fig. 1 of the drawings and screw threaded on this screw threaded portion 1c is a bushing member 2a which is provided with an extended flange portion 2b at its lower end upon which is revolubly mounted an adjustable upright 2 as shown best in Fig. 1 of the drawings. This member 2 is provided with an extended upper end portion 2c which is provided with a square hole therethrough in which the main bar 3 is shiftably mounted longitudinally and secured by means of a set screw 2d which extends from the upper side of the portion 2c against the main bar 3, all as shown best in Fig. 1 of the drawings. This main bar 3 is square and hollow as shown best in Fig. 2 of the drawings.

It is provided on its upper side, as shown in Fig. 5 of the drawings with a graduated scale of inches and fractions of inches starting from the head plate 21 and positioned on the side of the bar 3 is a dioptric indicating scale with a zero point substantially twenty inches from the head plate and the minus scale from said zero point toward the head of the plate and a plus scale in the opposite direction, as shown best in Fig. 1 of the drawings. Operating in conjunction with the dioptric plus and minus scale is a pointer 6a, shown best in Fig. 1 of the drawings which indicates the relation of the target member 4 with the dioptric plus and minus scale, thus indicating the condition of the eye and determining by the scale the dioptric error of the eye under examination. This pointer 6a is supported on a target support 6 substantially in alignment with the target 4. This target 4 is a vertical plate made of translucent or transparent material and is provided with a colored spot 4a substantially at its center, shown in Fig. 6 of the drawings. This target 4 is also supported in one side of the target illuminating box 5 which is a substantially cube shaped hollow box provided with an electric light bulb 5a therein for illuminating the interior of said box and the light shines through the translucent target member 4, as shown best in Fig. 1 of the drawings, thus providing means for illuminating the target from the back side so that the spot 4a shows up distinctly at all times. The lower side of this box 5 is provided with an opening 5b through which the light shines for illuminating the diopter scale on the bar 3.

The support 6 is provided with a recess 6b in which is pivotally mounted a support member 6c in which are mounted bifurcated members 6d and 6e and the members extend upwardly on opposite sides in which the front side of the box 5 is supported, as shown best in Figs. 1 and 5 of the drawings. This pivotal support 6c is secured in relation with the support 6 by means of a thumb screw 6f, shown best in Fig. 2 of the drawings. The box 5 together with the target 4 may be readily removed or shifted, as desired, upon its pivotal point. This support 6 is secured on one end of the target adjusting rack 7 which is shifted longitudinally with the bar 3 by means of the pinion 7 which is pivotally mounted upon the supports 12 and 13 by means of the shaft 8a which extends outwardly from the support member 12 and on the extended end of which is mounted the hand wheel 17 for turning the pinion 8 and therefore shifting the rack 7 backwardly and forwardly carrying with it the illuminating box 5 and the target 4. The support members 12 and 13 are positioned against the opposite side of the main bar 3 and against the lower side is a support 14 and against the upper side a support 15. Thus the supports 12 to 15 are secured in position on the main bar 3, as shown best in Fig. 2 of the drawings and are secured together by means of screws 12a. The support 15 is provided with an opening extending therethrough in which is reciprocally mounted the target adjusting rack 7. Secured to the upper edges of the supporting members 12 and 13 by means of screws 16a and separators 16b, is the objective indicator support 16 which is a hood-like member shown best in Fig. 2 of the drawings. Pivotally secured to the lower side of this member 16 is a supporting bar 9a and rigidly secured on the lower side of said support 16 is another support 9b on which is rigidly supported the objective indicator 9, and pivotally supported on the support 16 is another support bar 10a upon which is secured the objective indicator 10, so that the objective indicator 10 is shiftable relatively to the objective indicator 9. Connected with the support 10a and with one side of the support 16 is a tension spring 10b which tends to hold the objective indicator 10 toward the objective indicator 9, shown best in Figs. 2 and 4 of the drawings. Positioned between the supports 9a and 10a and beneath the adjacent edges of the objective indicators 9 and 10 is the objective indicator control bar 11 which is pivotally mounted at its one end on a bifurcated lug 6g extending backwardly on the support 6, as shown best in Fig. 1 of the drawings. This member 11 is tapered so that when the support 6 is shifted by means of the rack 7 relatively to the supports 12 and 13, the inclined side edges of the member 11 cause the member 10 to move away from or toward the member 9, it being noted that the member 9 is positioned slightly above the member 10 on an angle so that the edge of the member 10 may slide just under the edge of the member 9 when the member 11 will permit the spring to draw it in such relation. Thus the shifting of the support 6 relatively to the support 12 will cause a proportionate shifting of the member 10 relatively to the member 9, thus providing an objective indicator 11b for the operator's use following the eye condition while the subjective test is going on. Thus it will be noted that there is provided both a subjective and objective test. In order to provide a proper adjustment of the relation of the members 9 and 10, there is provided an adjusting screw 18 which is screw threaded into the support 16 and its end is adapted to engage the side of the support 9a which engages and shifts the control bar 11 on its pivotal axis for adjusting the relative position of the member 10 to the member 9 to provide for proper adjustment.

It will be here noted that the member 12 and its connecting supports may be shifted upon the main bar 3 to varying suitable positions or may be fixed thereto and it is provided with a handle member 14a to facilitate its shifting.

Secured to the one end of the bar 3 is a chin rest support 19, the upper end 19a of which extends some distance above the bar as shown best in Fig. 1 of the drawings and its lower end extends considerably below said bar 3 and it is provided with a right angled bifurcated portion 19b which extends backwardly. The bifurcated portions 19b are provided with vertical holes in which is mounted a threaded member 19c upon which is screw threaded a hand nut 19d which is positioned between the bifurcated portions of the member 19b as shown best in Fig. 1 of the drawings and is adapted for raising and lowering the member 19c for adjusting the pin rest 20 which is secured on the upper end of the member 19c and is provided with two guide members 20a which extend on opposite sides of the portion 19a of the support 19 for guiding the chin rest.

It will be here noted that the chin rest 20 is provided with two chin receiving recesses 20b and 20c in which the chin rests for testing the eyes separately.

Secured on the upper side of the main bar 3 and resting against the upper end of the portion 19a of the support 19 and further secured by an angle member 21a is the head plate 21 which is a disk like member provided with a central hole 21b, shown best in Fig. 8 of the drawings. Secured to this head plate 21 just below the hole 21b is a trial lens support 31 by means of screws 31a which are screwed into the head plate 21 and extend through spacers 31b for spacing the member 31 from the head plate 21 as shown best in Fig. 1 of the drawings. This trial lens support is provided at its upper end with a semi-circular portion 31c which is slotted at 31d to receive the trial lens and hold it in position over the hole 21b. These screws 31a also secure a sight member support 23a in position centrally in front of the hole 31b, which support is a cylindrical member open at both ends and in which is removably mounted the sight member 23 which is provided with a bell-shaped open front end and is provided with a reduced portion which fits the interior of the cylindrical support 23a and is provided at its extended end with a small opening 23b and it is prevented from turning by means of a pin 23c which is positioned in a slot extending longitudinally in the upper side of the supporting member 23a, as shown best in Fig. 9 of the drawings, thus providing a small sight hole 23b which is concentric with the hole 21b and with the arcuate semi-circular portion 31c of the trial lens support 31. Pivotally supported on the plate 21 above the hole 21b some distance is the prism support 22. This prism support 22 is shaped as shown best in Fig. 7 of the drawings and is provided with a plate portion 22a positioned concentrically with the hole 21b when the member 22 is suspended directly downwardly from its pivotal support as shown in Fig. 7 of the drawings. It is provided with a central hole 22b. Positioned in front of this plate 22a at the center is a pair of bases joined prisms 24 and 25 which is divided vertically through the center of the hole 22b in the plate 22a. Positioned in front of these prisms 24 and 25 is a plus two spherical segment 26 which is spaced from the prisms 24 and 25 by means of a washer 26a which also has a hole concentric with and conforming to the hole 22b in the member 22a. This plus two segment 26 is supported by means of a metallic plate 26b. The prisms 24 and 25 and washer 26 are supported and surrounded by an annular member of substantially the same diameter as the member 22a and revoluble in the member 22 and designated 24a on the outer side of which is positioned a pointer 24b which serves as an indicator pointer in connection with a scale 22c positioned on the member 22. These plate members 26 and 24a are revoluble and are provided with an extended arm member 26d to facilitate their turning. Secured to the plates 21 slightly below the prism support pivot point is a latch member 22d which is a spring clip latch which is adapted to receive the narrow portion of the member 22 and hold it in its vertical position as shown in Fig. 7 of the drawings. It is also provided with a stop pin 22e against which one side of the member 22 rests as shown best in Fig. 7.

It will be here noted that the scale 22c is provided with degree calibration of a semi-circle from zero to one hundred and eighty degrees and the pointer 24b is centralized at the ninety degree calibration on the scale. This pointer 24b also shows the junction of the bases of the two prisms 24 and 25 so that by operating the lever 26d in either direction from the ninety degree on the scale, the prisms 24 and 25 are shifted and causes the phenomenon of the apparition caused by the spot on the target moving in either direction in the same proportion. Therefore the pointer 24b indicates the axis of any astigmatic error. For instance, when the pointer points at ninety degrees, the apparition spots are seen in the horizontal meridian or zero to one hundred and eighty degrees. If the pointer is shifted to an angle of forty-five degrees, the apparition spot would be seen at axis one hundred and thirty-five, etc.

Secured near the upper side of the head plate 21 and extending substantially horizontally across the same is the head adjusting rack support 27 which includes two horizontal bars 27a and 27b, the bar 27b being positioned slightly above the bar 27a as shown best in Fig. 1 of the drawings, and positioned on these two members and surrounding the member 27b is a slide member 27c which is provided with a thumb screw 27d for clamping the same in position on the bars 27a and 27b. Secured to the member 27b is a head adjusting rack member 28 to the opposite ends of which are pivotally connected the head adjusting members 29 and 30, shown best in Fig. 5 of the drawings. These members 29 and 30 are provided with vertical pads 29a and 30a which are adapted to rest against the sides of the head of the person having their eyes tested. These members 29 and 30 are shifted on their pivotal support and held in certain spaced relation to each other by means of bolts 29b and 30b which are screw threaded in lugs 28a and with springs interposed between said lugs and the members 29 and 30 as shown best in Fig. 5 of the drawings.

The operation of my eye testing apparatus is substantially as follows:

The main bar 3 upon which the target and illuminating means together with the shift mechanism are mounted, is graduated on its upper side in inches and fractions and on the side at the twenty inch mark is a zero point, which is the balance point of the dioptric scale. Both to the left and right of this point, the dioptric scale is calibrated to one thirty-second of an inch showing dioptric values of from point nought six and one-quarter and including that subdivision up to one-half inch one diopter and on upward to sixteen diopters plus and twenty-two diopters minus as indicated by the pointer 6a. The two small red disks 9 and 10 are adjusted by movement of the disk 10 by means of the adjusting screw 10c which enables the operator to adjust or set the red disks as the patient sees the apparition disks while looking through the sight at the target. This keeps a check on the movement of the apparition disk and makes it both a subjective and objective eye test working in unison and simultaneously. It prevents the misleading of the operator in the process of his examination. The member 22 may be shifted aside as shown by dash lines in Fig. 7 to permit the use of test lenses positioned in the member 31 in the slot 31d between the side member 23 and the hole 21b in the head plate 21.

The accommodation of the eye is compensated by the plus two lens 26 located at the sight and supported in the member 22 and operates in accordance with the accepted theory of the laws of accommodation in refraction. The calibration of the dioptric scale on the side of the main bar 3 is accurate and may be proved by inserting a plus or minus one sphere in the lens support at the eye piece. The lens will neutralize exactly at one-half inch in the shifting of the control by shifting the rack 7 by means of the hand wheel 17.

It will be noted that applicant's structure provides a combined refractor and ophthalmometer and both a subjective and objective test working in unison and operated by the same control and operates without refractive lenses, the test lenses only being used if desired as proof.

The way to proceed with an examination is substantially as follows: The pointer 6a should be positioned at the zero point on the dioptric scale. Then the patient is requested to look with the right eye into the eye piece. For illustration purposes, we will assume that the patient is a hyperope and sees the apparition disks overlapped about one-sixteenth of an inch in which case the disks 9 and 10 are set by adjustment to conform to the patient's description. Then the hand wheel 17 is turned to the right until the patient sees the apparition disks tangent and we will assume that the pointer shows plus two on the dioptric scale and the operator is ready to write the prescription from the reading on the dioptric scale either plus or minus.

Now assuming an astigmatic error for correction with the pointer at ninety degrees, the apparition spot at one hundred and eightieth meridian and assuming the spots just tangent with the pointer at the balance point on the dioptric scale on the main bar 3, that would indicate that the one hundred and eightieth meridian of the eye under test is normal. The operator then shifts the pointer to the one hundred and eightieth meridian and the patient sees the spots on the target are separated. That would shown an unequal curvature or variation of those two principal meridians of the eye under examination and myopic astigmatism would be indicated and a minus cylinder at axis one hundred and eighty degrees would be the corrective lens. Thus it will be noted that by rotating the prism from zero to one hundred and eighty, a quick astigmatic test may be made to determine any irregularity of the curvature of the refractive media of the eye under examination.

Though I have shown and described a particular construction, combination and arrangement of parts and portions I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an eye testing apparatus of the class described, the combination of a pair of revolubly mounted base joined prism members, a target member provided with a single colored circular spot positioned in alignment with the base line of said base joined prism members, means for shifting said target member toward and away from said base joined prism members, indicating means in connection with said target member for indicating the shiftable movement of said target relatively to said base joined prism members, and a pair of circular objective indicators in cooperative relation with said target and wedge-shaped means in connection with said target for shifting said circular objective indicators toward and away from each other corresponding to the apparition of the target caused by said base joined prism members.

2. In an eye testing apparatus of the class described, the combination of a pair of revolubly mounted base joined prism members, a target member provided with a single colored circular spot positioned in alignment with the base line of said base joined prism members, means for shifting said target member toward and away from said base joined prism members, a pair of circular objective indicators in cooperative relation with said target and wedge-shaped means in connection with said target for shifting said circular objective indicators toward and away from each other corresponding to the apparition of the target caused by said base joined prism members whereby the operator determined a hyperopic or myopic condition of the eyes being tested by the relative position of said objective indicators.

3. In an eye testing apparatus of the class described, the combination of a substantially horizontal bar, a pair of revolubly mounted base joined deflector members mounted on one end of said bar, a target member consisting of a single colored circular spot shiftably mounted on said bar, a pair of circular objective indicators mounted on said bar in cooperative relation with said target and wedge-shaped means in connection with said target for shifting said circular objective indicators toward and away from each other corresponding to the apparition of the target caused by said base joined deflector members.

4. In an eye testing apparatus of the class described, the combination with a main bar, a pair of revolubly mounted base joined prism members mounted on one end of said main bar and a target member consisting of a single colored circular spot shiftably mounted on said bar, of means for shifting said target stationarily mounted on said main bar, a pair of circular indicator members shiftably mounted on said means, and a wedge-shaped indicator control bar in connection with said target and in engagement with said indicator members and arranged to shift said indicator members away from each other.

5. In an eye testing apparatus of the class described, the combination with a main bar, a pair of revolubly mounted base joined prism members mounted on one end of said main bar, a target member consisting of a single colored circular spot shiftably mounted on said bar, of means for shifting said target stationarily mounted on said main bar, a pair of circular indicator members shiftably mounted on said means, a wedge-shaped indicator control bar in connection with said target and in engagement with said indicator members and arranged to shift said indicator members away from each other, and spring means arranged to force said indicator members toward each other.

6. In an eye testing apparatus of the class described, the combination of a main bar, a shiftable target thereon, stationary means in connection with said main bar, circular indicator members shiftably mounted on said stationary means, and a wedge-shaped indicator control bar member in connection with said target for shifting said indicator members relatively to each other.

7. In an eye testing apparatus of the class described, the combination of a main bar, a shiftable target thereon, stationary means in connection with said main bar, circular indicator members shiftably mounted on said stationary means, a wedge-shaped indicator control bar member in connection with said target for shifting said indicator members relatively to each other, and an adjusting screw in connection with said stationary means for shifting one of said indicators relatively with the other indicator.

HOMER T. LOWRY.